United States Patent Office 3,504,513
Patented Apr. 7, 1970

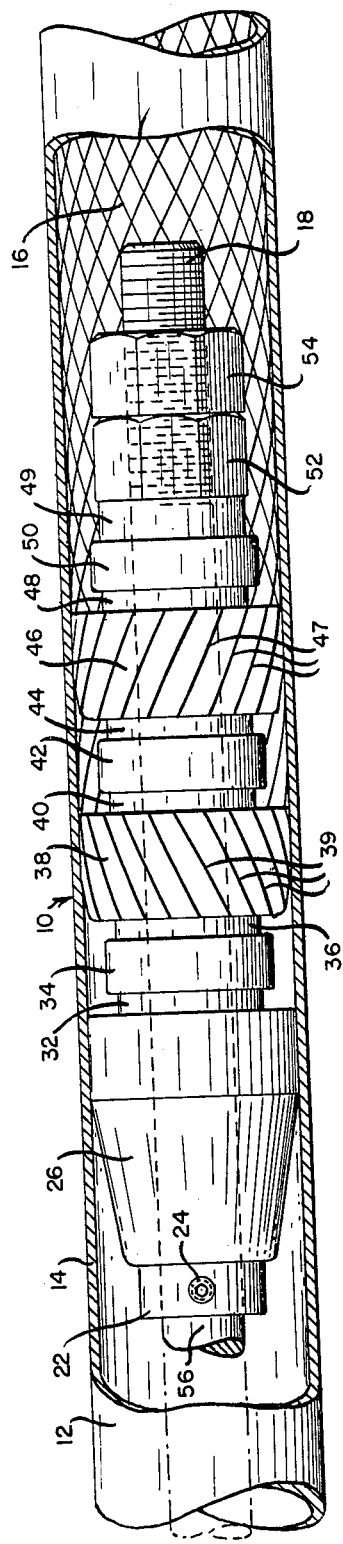
INVENTOR
Otis J. Black

3,504,513
APPARATUS FOR SCORING A TUBE FOR LINING
Otis J. Black, Shelby, Ohio, assignor to Copperweld Steel Company, Glassport, Pa., a corporation of Pennsylvania
Filed Aug. 11, 1967, Ser. No. 660,106
Int. Cl. B21d 17/60
U.S. Cl. 72—112               4 Claims

ABSTRACT OF THE DISCLOSURE

A metal tube is prepared for lining by scoring it on the inside surface. A plastic resilient tube liner is then inserted and the metal tube is swaged causing the metal tube to compress around the plastic tube liner which is gripped by the scoring on the inside surface of the tube. The scoring apparatus has a mandrel means which carries an expanding mandrel for sizing and rounding the tube and a plurality of cylindrical scoring members which have rib-like scoring surfaces at an inclined angle to the longitudinal axis. When the mandrel means is pulled through the tube the scoring members rotate and score a series of parallel helical scores.

---

This invention relates to an apparatus for scoring the inside of a metal tube in preparation for bonding a plastic liner.

In order to inhibit corrosive chemicals on metal tubes, a plastic liner is bonded to the inside of the metal tube. One known method for bonding the liner to the tube includes scoring the inside surface of the tube, inserting a liner and then passing the metal tube through a swaging machine thus causing a swaging of the tube onto the liner. The scored inside wall of the metal tube helps to bond the plastic liner to the tube. To score the inside of the metal tube a cylindrical tool having a plurality of star-shaped wheels exposed through a plurality of slots in the tool has been used. The tool is pulled longitudinally through the tube and causes indentations on the inside wall. All of the indentations are made in a straight line. Such a tool is described as a "picking tool" in U.S. Patent No. 3,315,348. One of the problems involved with this earlier equipment is that it is more expensive to manufacture and has many moving parts. The life of the equipment is greatly reduced by the fact that a compressive force is constantly being exerted upon the bearing surfaces of the star wheels. The present invention greatly simplifies the apparatus for scoring and is a substantial improvement.

I provide an apparatus for scoring the inside of a metal tube for bonding a liner within the tube which comprises mandrel means adapted to fit within the bore of the tube having a plurality of thrust bearing surfaces; and scoring means rotatably mounted on the thrust bearing surfaces each having an axis coaxial with the axis of the tube and having a plurality of rib-like scoring surfaces on its circumferential surface inclined at an angle to the longitudinal axis of the scoring means and having an outside diameter larger than the inside diameter of the tube whereby longitudinal movement of the mandrel means through the tube will cause the scoring means to rotate within the tube and score a series of parallel helical scores in the inside of the tube. I preferably provide first and second cylindrical scoring members each having rib-like scoring surfaces inclined at an angle to the longitudinal axis of the scoring member. The angles formed on each scoring member between the rib-like surfaces and the longitudinal axis of the scoring members are opposite in direction whereby longitudinal movement of the mandrel means through the tube will cause the scoring members to rotate within the tube in opposite directions.

I also provide a means for rounding and sizing the tube prior to the scoring of the tube by the scoring members.

Other details, objects and advantages of the invention will become apparent as the following description of the presently preferred embodiment and presently preferred method of practicing the same proceeds.

In the accompanying drawing I have shown a presently preferred embodiment of the invention and have illustrated a presently preferred method of practicing the same in which the figure shows a cut-away portion of a metal tube with a scoring apparatus within the tube.

The figure shows an apparatus generally referred to as 10 for scoring the inside of metal tube 12 which is shown as cut away 14 to score a pattern 16. The apparatus 10 comprises a mandrel means 18 adapted to fit within the bore of the tube 12. A collar 22 is secured to the mandrel 18 by a set screw 24. The collar 22 retains expanding mandrel 26 which has its largest diameter larger than the inside diameter of tube 12. The expanding mandrel 26 sizes and rounds the tube 12 as it moves through the tube 12. The expanding mandrel 26 is followed by a spacer 32, a thrust bearing 34 and a spacer 36. A first cylindrical scoring member 38 is rotatably mounted on the mandrel means 18 and has its axis coaxial with the axis of the tube 12. The first cylindrical scoring member 38 has a plurality of rib-like scoring surfaces 39 on its circumferential surface inclined at an angle to the longitudinal axis of the scoring member 38 and having an outside diameter larger than the inside diameter of the tube 12 whereby longitudinal movement of the mandrel means 18 through the tube 12 will cause the member 38 to rotate within the tube 12 and score a series of parallel helical scores in the inside of the tube 12 forming a portion of pattern 16. The first cylindrical scoring member 38 is followed by a spacer 40, a thrust bearing 42 and a spacer 44. A second cylindrical scoring member 46 is rotatably mounted on the mandrel means 18. The second cylindrical scoring member 46 has an axis coaxial with the axis of the tube 12 and has a plurality of rib-like scoring surfaces 47 on its circumferential surface inclined at an angle to the longitudinal axis which is opposite in direction to the angle between the axis and the scoring surfaces 39 on the first scoring member 38. The second scoring member 46 has an outside diameter larger than the inside diameter of the tube 12 whereby longitudinal movement of the mandrel means 18 through the tube 12 will cause the second scoring member 46 to rotate within the tube 12 in the opposite direction from the first scoring member 38 and score a second series of parallel helical scores in the inside of the tube 12 but with opposite direction of rotation from the first helical scores. The combined scores from the first and second members 38 and 46 produce the pattern 16 on the inside of tube 12. The second cylindrical scoring member 46 is followed by spacers 48 and 49 and thrust bearing 50 which are secured by nuts 52 and 54 threaded onto mandrel means 18. The mandrel means 18 is coupled to or can form an integral part of a draw rod (not shown) at point 56 of the mandrel means 18. The draw rod (not shown) is pulled through the tube 12 by a draw bench (not shown). After the apparatus 10 is drawn through the metal tube 12 scoring a pattern 16 on the inside metal surface of the tube 12, a resilient plastic tube liner is inserted within the metal tube 12. The metal tube 12 is then swaged causing the metal tube 12 to compress around the resilient plastic tube liner which is bonded within the scored pattern 16 on the interface of metal tube 12 causing a bond.

While I have shown and described the presently preferred embodiment and presently preferred method of practicing the same, it is to be distinctly understood that the invention is not limited thereto but may be otherwise variously embodied within the scope of the following claims.

I claim:
1. Apparatus for scoring the inside of a metal tube which comprises:
   (a) Mandrel means adapted to fit within the bore of the tube;
   (b) A first cylindrical scoring member freely rotatably mounted on the mandrel means, the scoring member having an axis coaxial with the axis of the mandrel means and having a plurality of rib-like scoring surfaces on its circumferential surface inclined at an angle to the longitudinal axis of the scoring member and having an outside diameter larger than the inside diameter of the tube whereby longitudinal movement of the mandrel means through the tube will cause the scoring member to rotate about the axis of the mandrel means within the tube and score a series of parallel helical scores in the inside of the tube; and
   (c) A second cylindrical scoring member freely rotatably mounted on the mandrel means, the second scoring member having an axis coaxial with the axis of the mandrel means and having a plurality of rib-like scoring surfaces on its circumferential surface inclined at an angle to the longitudinal axis which is opposite in direction to the angle between the axis and the scoring surfaces on the first scoring member, the second scoring member having an outside diameter larger than the inside diameter of the tube whereby longitudinal movement of the mandrel means through the tube will cause the second scoring member to rotate about the axis of the mandrel means within the tube and in the opposite direction from the first scoring member and score a second series of parallel helical scores in the inside of the tube but with opposite direction of rotation from the first helical scores.

2. An apparatus as recited in claim 1 wherein the first and second scoring members are closely spaced by spacer means.

3. An apparatus as recited in claim 1 including a first thrust bearing mounted on the mandrel means and positioned near the first member so that any thrust forces exerted upon the first member are transmitted to the first thrust bearing and a second thrust bearing mounted on the mandrel means and positioned near the second member so that any thrust forces exerted upon the second member are transmitted to the second thrust bearing.

4. An apparatus as recited in claim 1 including an expanded mandrel mounted on said mandrel means and having its largest diameter larger than the inside diameter of the tube.

References Cited

UNITED STATES PATENTS

| | | | |
|---|---|---|---|
| 743,400 | 11/1903 | Sherman | 29—507 |
| 2,228,018 | 1/1941 | Scholtes | 29—507 |
| 2,262,171 | 11/1941 | Downes | 29—507 |
| 2,268,088 | 12/1941 | Scholtes | 72—479 |
| 2,852,835 | 9/1958 | Harvey et al. | 29—1 |

LOWELL A. LARSON, Primary Examiner

U.S. Cl. X.R.

29—507; 72—479, 703

UNITED STATES PATENT OFFICE
CERTIFICATE OF CORRECTION

Patent No. 3,504,513 April 7, 1970

Otis J. Black

It is certified that error appears in the above identified patent and that said Letters Patent are hereby corrected as shown below:

Column 4, line 18, "expanded" should read -- expanding --.

Signed and sealed this 22nd day of December 1970.

(SEAL)
Attest:

Edward M. Fletcher, Jr.
Attesting Officer

WILLIAM E. SCHUYLER, JR.
Commissioner of Patents